US012772925B2

(12) United States Patent
Sivinski

(10) Patent No.: US 12,772,925 B2
(45) Date of Patent: Oct. 27, 2026

(54) AGRICULTURAL ROW UNIT LIFT ASSEMBLY

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake (LA)

(*) Notice: Subject to any disclaimer, the term of this patent is extended or adjusted under 35 U.S.C. 154(b) by 833 days.

(21) Appl. No.: 18/150,538

(22) Filed: Jan. 5, 2023

(65) Prior Publication Data

US 2023/0210043 A1 Jul. 6, 2023

Related U.S. Application Data

(60) Provisional application No. 63/266,431, filed on Jan. 5, 2022.

(51) Int. Cl.
*A01C 7/20* (2006.01)

(52) U.S. Cl.
CPC .............. *A01C 7/208* (2013.01); *A01C 7/203* (2013.01)

(58) Field of Classification Search
CPC ........... A01C 7/203; A01C 7/208; A01C 5/04; A01C 5/064; A01C 5/08; A01B 79/00; A01B 79/02
See application file for complete search history.

(56) References Cited

U.S. PATENT DOCUMENTS

| | | | | |
|---|---|---|---|---|
| 3,680,648 A * | 8/1972 | Tonsfeldt | A01B 39/00 172/671 |
| 3,831,536 A * | 8/1974 | Orthman | A01B 79/02 111/923 |
| 4,311,104 A * | 1/1982 | Steilen | A01C 7/201 111/194 |
| 5,868,207 A * | 2/1999 | Langbakk | A01C 7/201 172/321 |
| 6,253,692 B1 * | 7/2001 | Wendling | A01C 7/006 111/139 |
| 2010/0192820 A1 * | 8/2010 | Stark | A01C 7/203 111/69 |
| 2017/0034986 A1 * | 2/2017 | Koch | A01G 7/00 |
| 2019/0281756 A1 * | 9/2019 | Sivinski | A01C 7/203 |
| 2020/0359545 A1 * | 11/2020 | Ptacek | A01C 5/068 |

OTHER PUBLICATIONS

Planting Seed Corn 2020: Why we split female/male inbreds for perfect pollination & seed quality https://www.youtube.com/watch?v=Mw7MpxXAeP4 (Year: 2020).*

* cited by examiner

*Primary Examiner* — Christopher J Sebesta
*Assistant Examiner* — Audrey L Lusk
(74) *Attorney, Agent, or Firm* — McKee, Voorhees & Sease, PLC

(57) ABSTRACT

A lift assembly includes an insert frame between the toolbar and a row unit on agricultural planter. The lift assembly frame includes an actuator which is extended and retracted to raise and lower a pair of arms engaging a crop shaft connected to the parallel link arms of the row unit, to thereby raise and lower the row unit between planting and non-planting positions. With one of the lift assemblies associated with each row unit, the row units can be selectively raised and lowered for varied planting operations.

11 Claims, 25 Drawing Sheets

AGRICULTURAL ROW UNIT LIFT ASSEMBLY

CROSS REFERENCE TO RELATED APPLICATIONS

This application claims priority under 35 U.S.C. § 119 to provisional patent application U.S. Ser. No. 63/266,431, filed Jan. 5, 2022. The provisional patent application is herein incorporated by reference in its entirety, including without limitation, the specification, claims, and abstract, as well as any figures, tables, appendices, or drawings thereof.

TECHNICAL FIELD

The present disclosure relates generally to a lift assembly for an agricultural row planter unit and a corresponding method of raising and lowering the row planter units between planting and non-planting positions.

BACKGROUND

Agricultural planter row units include a frame, gauge wheels, furrow opening discs and furrow closing discs. Each row unit is mounted to a toolbar pulled by a tractor. Each row unit typically includes parallel link arms that allow the row unit to follow the soil terrain and accurately plant the seeds at a uniform depth. In recent years, automated downforce systems have been provided, which include a computer controlled hydraulic cylinder which adjusts the downforce on the row unit to accommodate soil variations and thereby provide more accurate planting and maximized yields. One example of such an automated downforce system is the DeltaForce, commercially available from Precision Planting in Tremont, Illinois.

Many modern agricultural planters are designed to plant ultra-narrow configurations, such as 7.5 inch, 10 inch, and 15 inch row spacing depending on the crops. These planters can also be used for planting wider row spacing, in increments of 7.5 inch., 10 inch., and 15 inch. For example, a typical soybean planter will plant rows spaced at 15 inches, which may be planted between corn rows spaced at 30 inches. Such a system is called interplant rows. The interplant soybean units are manually raised and locked in the raised position when planting corn or other wide-row crops. To raise the row units, the operator must physically lift the row unit so as to be above the ground using a tool, lifting bar, wood blocks, or a forklift. The row units can be locked in the raised position, for example, with a lock mechanism as described in U.S. Pat. No. 10,779,463. When the raised interplant row units are needed for planting, the row units must be mechanically unlocked and lowered to the planting position. Automated lift systems are not currently available. While manually lifting and lowering is not difficult, the process is time consuming and reduces the short planting period which farmers have to plant crops for maximum yield.

Therefore, a primary objective of the present invention is the provision of an automated system for raising and lowering individual row units, so as to reduce and minimize the time required for such raising and lowering of the row units.

SUMMARY

The lift assembly is an insert between the toolbar and the front mounting plate of a row unit on the agricultural planter. The lift insert includes a frame formed with front and rear plates, and opposite side plates. The lift insert further includes an actuator, controlled hydraulically, electrically, or pneumatically, to raise and lower a pair of arms which engage a crossbar or axle extending between the lower parallel link arms of the row unit. When the actuator is extended, the lift arms push the parallel link arms upwardly to raise the row unit. When the actuator is retracted, the lift arms allow the parallel link arms to pivot downwardly to lower the row unit. The row unit can be locked in the raised position, and then the actuator is retracted to remove pressure or stress on the actuator. With the plurality of lift assemblies mounted between the toolbar and the row units, an operator can selectively raise and lower the row units, as needed for planting.

DETAILED DESCRIPTION

Figure 1:
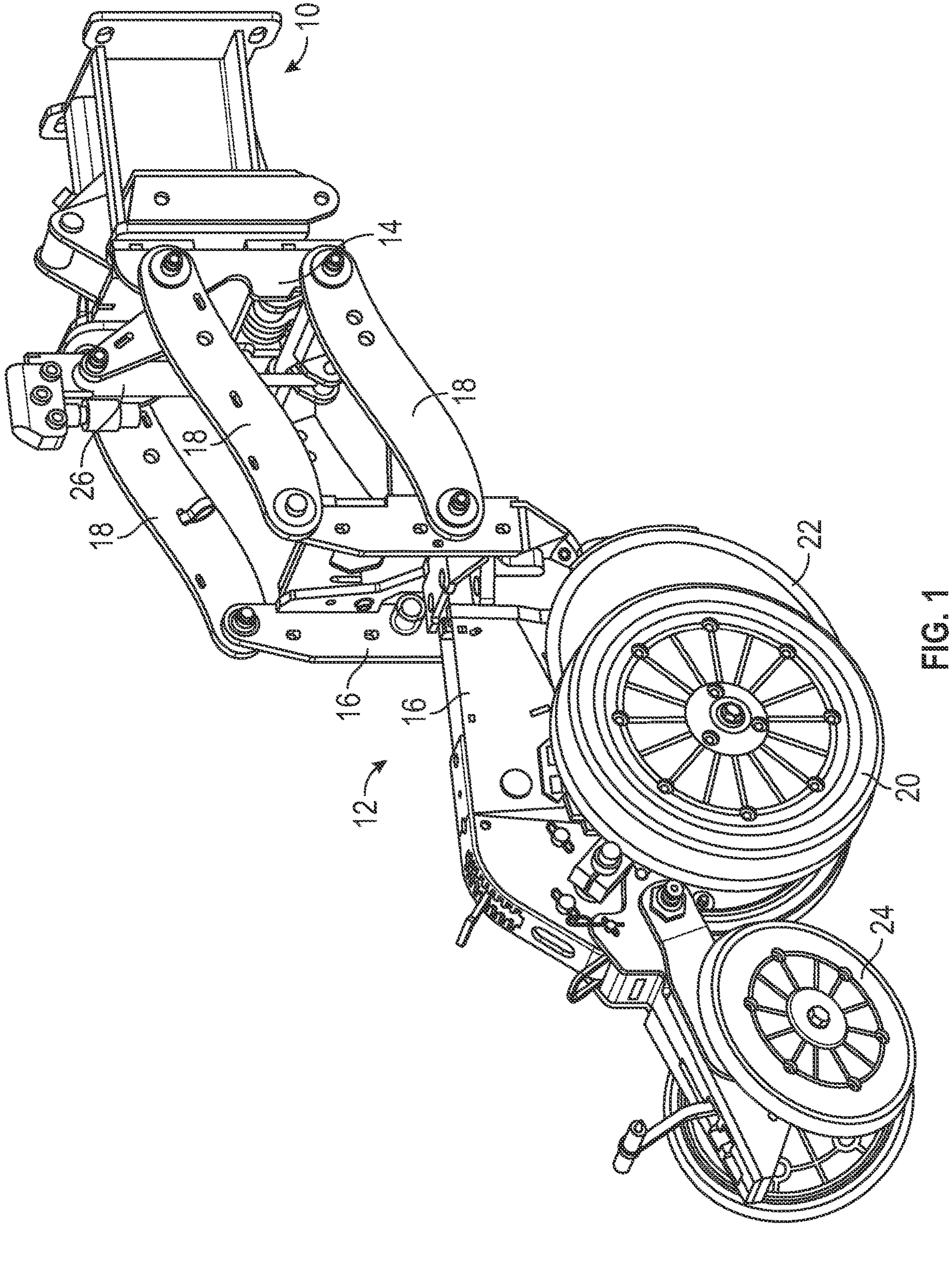
FIG. 1 is a perspective view of an agricultural planter row unit, with the lift assembly of the present invention in a retracted position so that the row unit is in a lowered, planting position.
Figure 2:
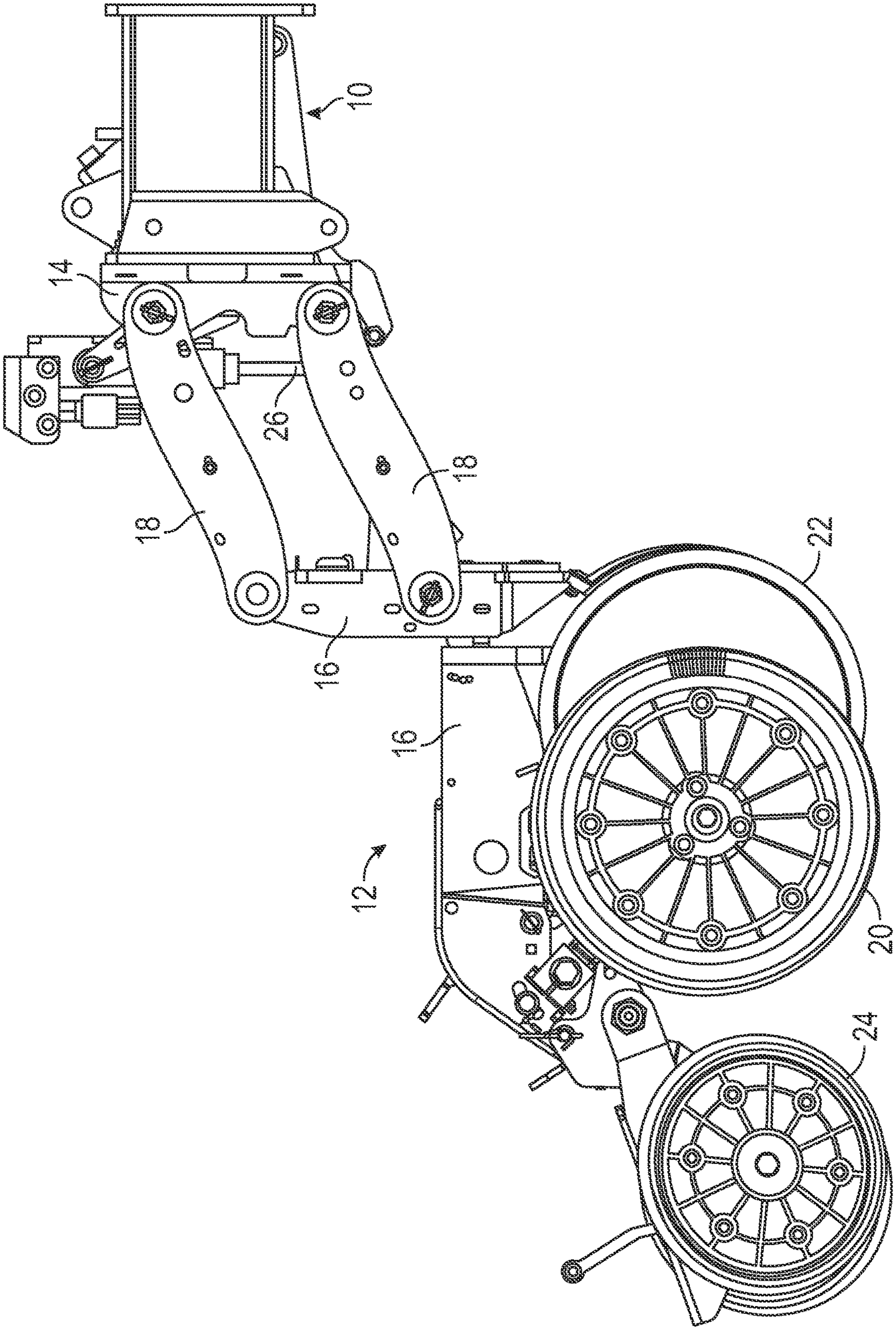
FIG. 2 is a right side elevation view of the row unit and lift assembly shown in FIG. 1, and the left side elevation view being a mirror image.
Figure 3:
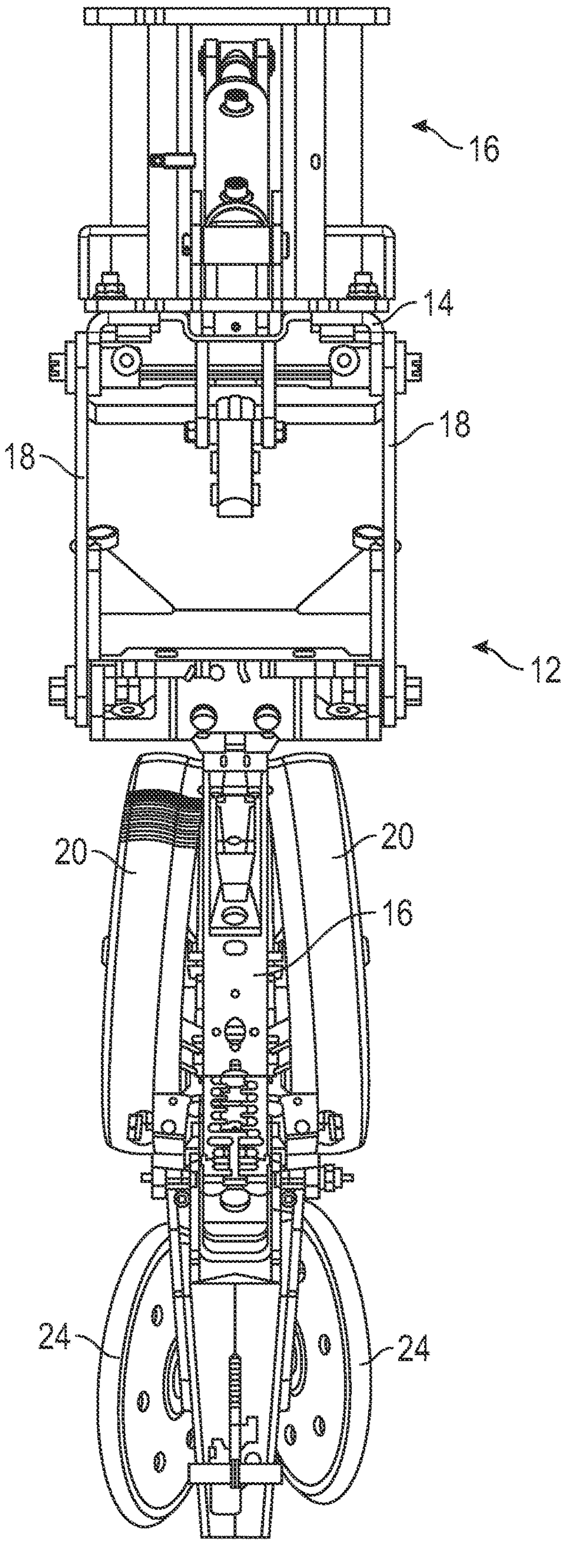
FIG. 3 is a top plan view of the row unit and lift assembly as shown in FIG. 1.
Figure 4:
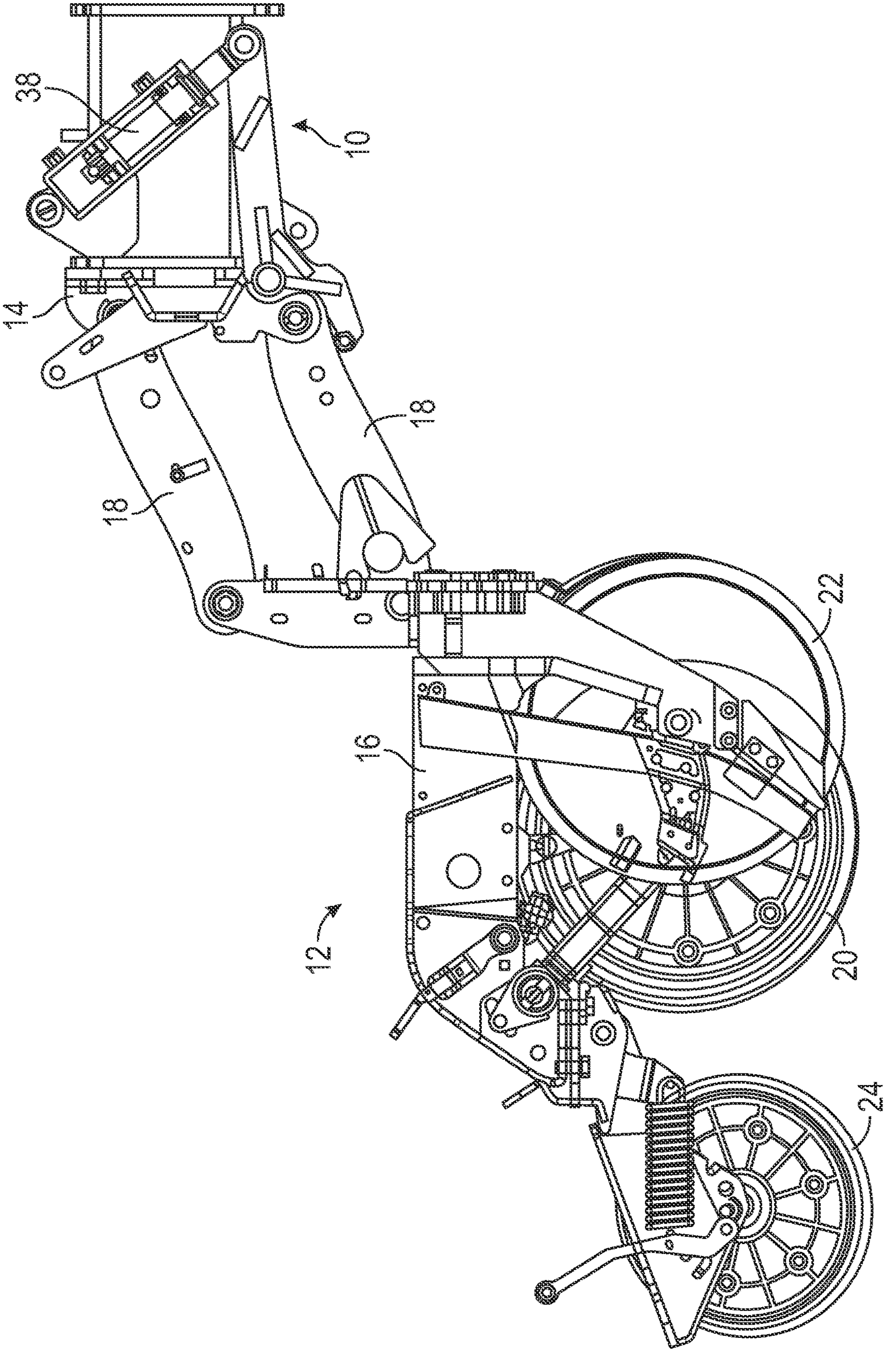
FIG. 4 is a sectional view taken along a longitudinal center axis of FIG. 1.
Figure 5:
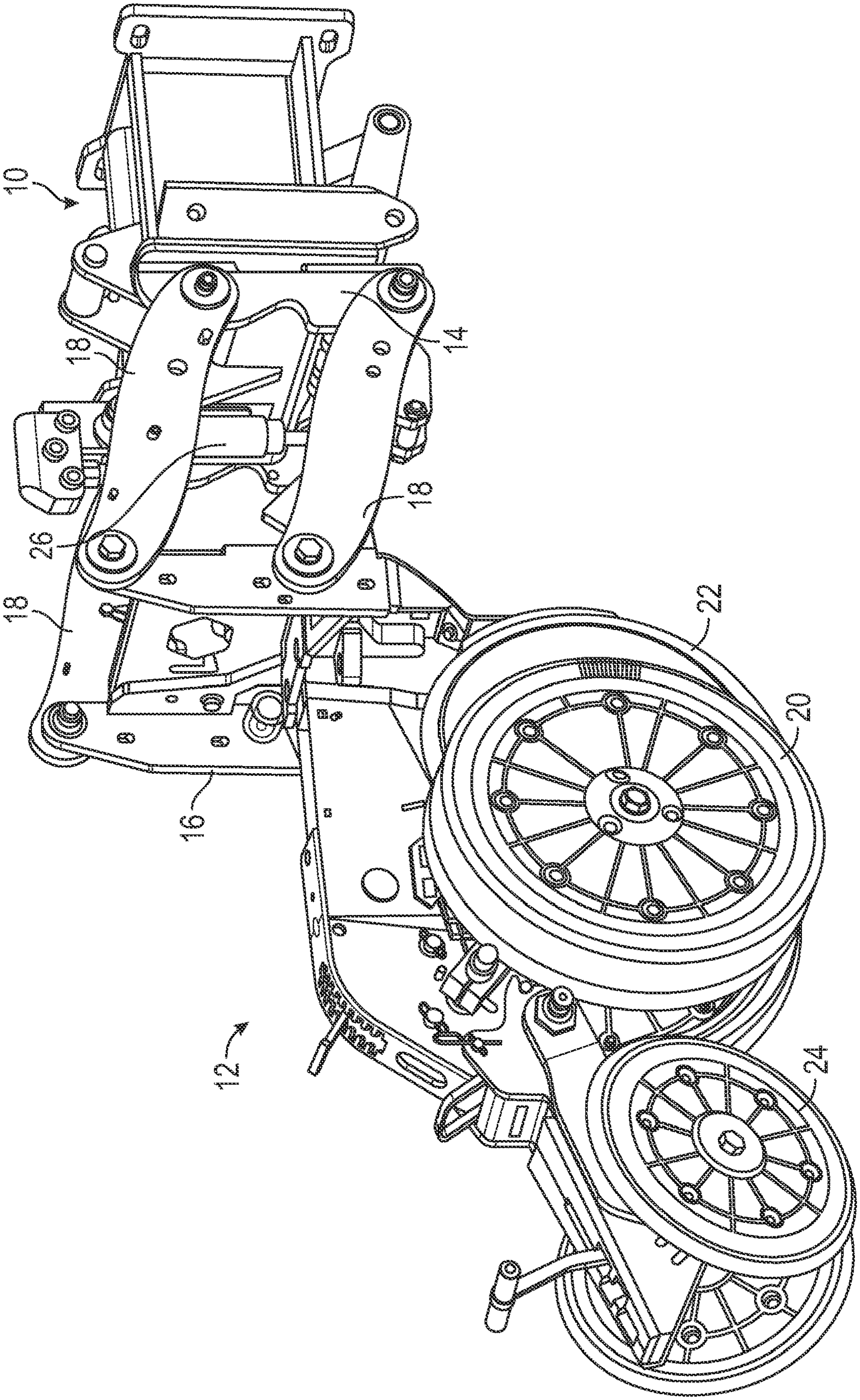
FIG. 5 is a perspective view of the row unit and lift assembly, with the lift assembly extended so as to raise the row unit to a non-planting position.
Figure 6:
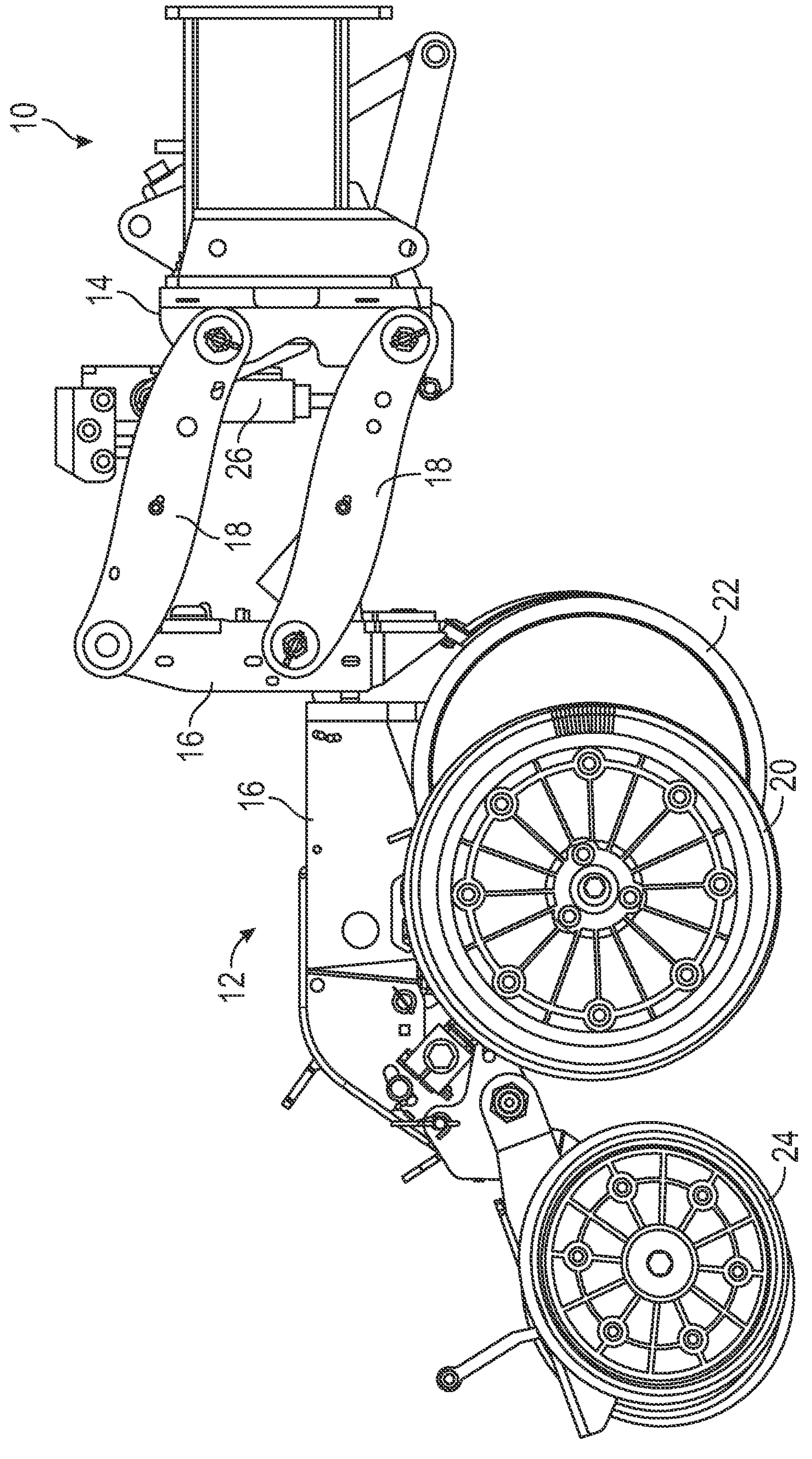
FIG. 6 is a right side elevation views of the row unit and lift assembly shown in FIG. 5, and the left side elevation view being a mirror image.
Figure 7:
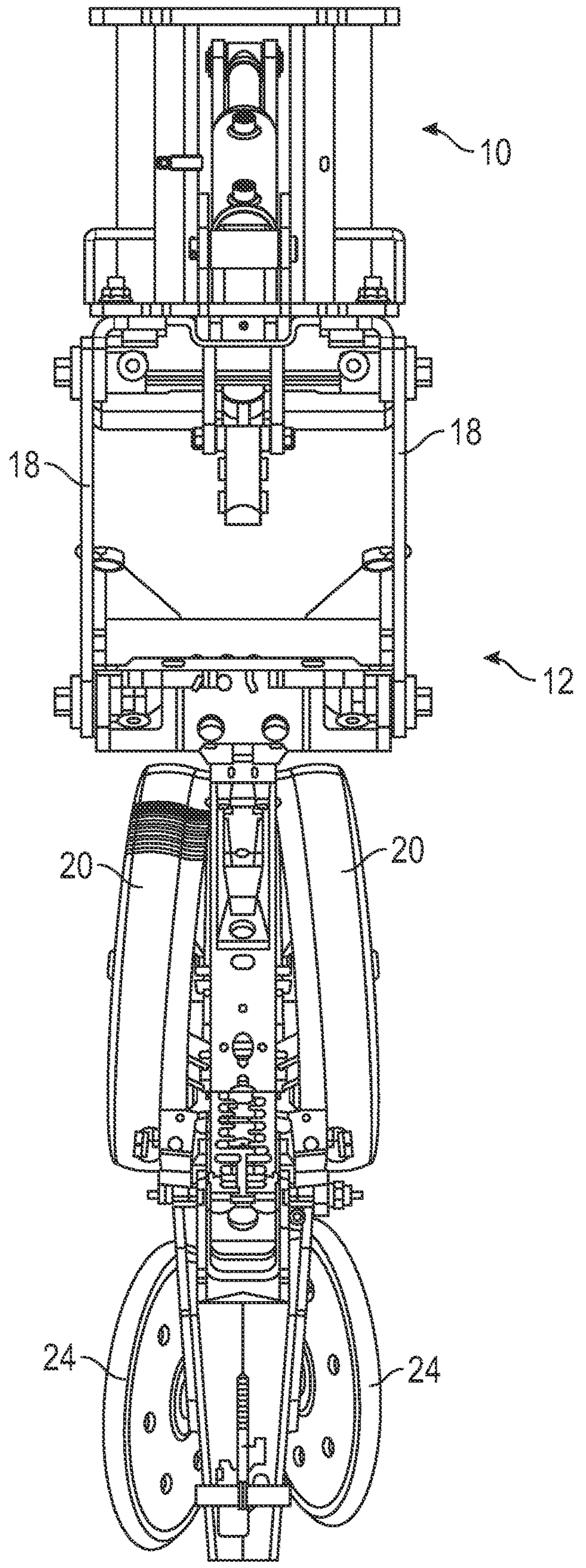
FIG. 7 is a top plan view of the row unit and lift assembly as shown in FIG. 6.

The lift assembly 10 for an agricultural planter row unit 12 resides between the row unit 12 and a toolbar (FIG. 1A). The row unit is conventional, manufactured by various companies. The row unit 12 generally includes a front mounting plate 14, a frame 16, and parallel link arms 18 connecting the frame 16 to the mounting plate 14. Frame 16 supports a pair of gauge wheels 20, a pair of discs 22 for opening a furrow, and a pair of wheels or discs 24 for closing the furrow after seed is planted. The row unit 12 also includes a downforce hydraulic cylinder 26 and controls to provide consistent planting depth for the seeds. One example of such an automated downforce system is the DeltaForce, by Precision Planting.

The lift assembly 10 of the present invention includes a front plate 30 adapted to be bolted to the toolbar, and a rear plate 32 adapted to be bolted to the mounting plate 14 of the row unit 12. The rear plate 32 may also include wings 34 on opposite lateral sides to which various accessories can be mounted. Examples of these accessories are described in Applicant's co-pending patent application Ser. No. 16/352,179. The lift assembly 10 also includes side plates 36 extending between the front rear plates 30, 32. One of the side plates 36 has been removed in FIGS. 8-11 for clarity of the structure behind the plate. The front and rear plates 30, 32 and the sides plates 36 form a frame which is inserted between the tool bar and the front plate of the row unit 10. One lift insert frame is utilized for each row unit on the planter.

Figure 11:
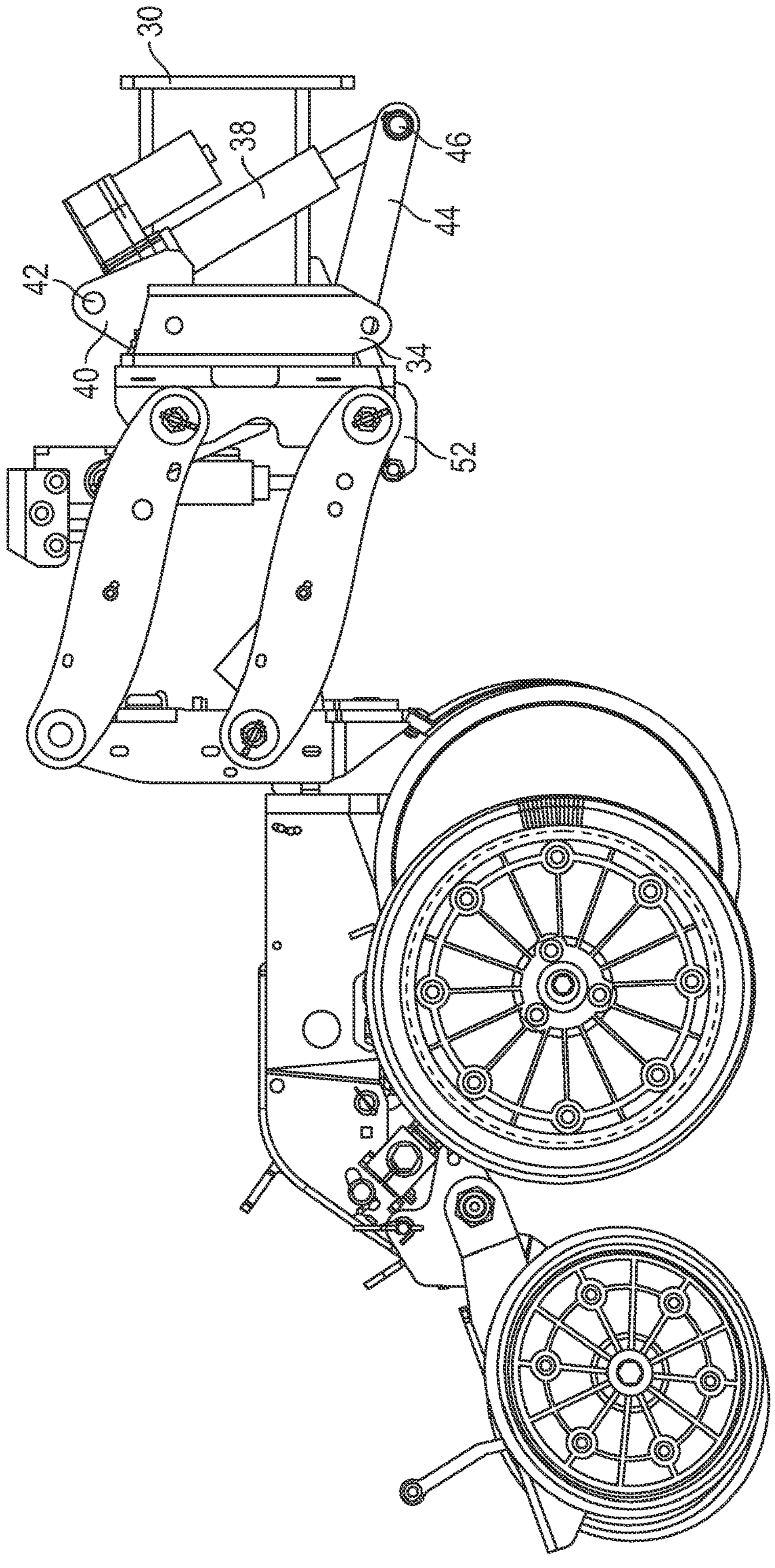
FIG. 11 is a side elevation view showing an alternative embodiment of the lift assembly having an electric actuator, and with the right side plate removed for clarity.
Figure 12:
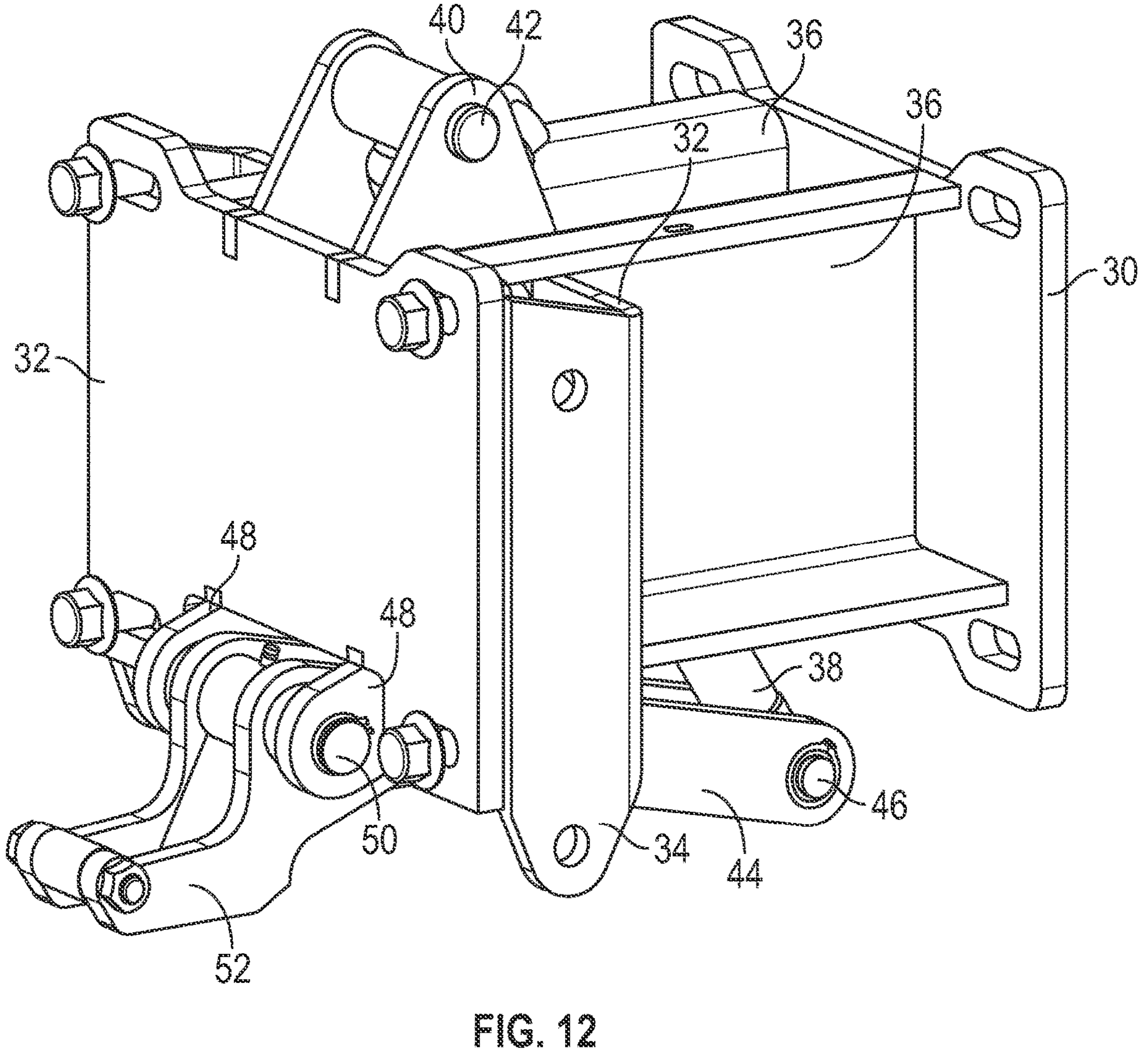
FIG. 12 is a perspective view of the lift assembly in an extended position.
Figure 13:
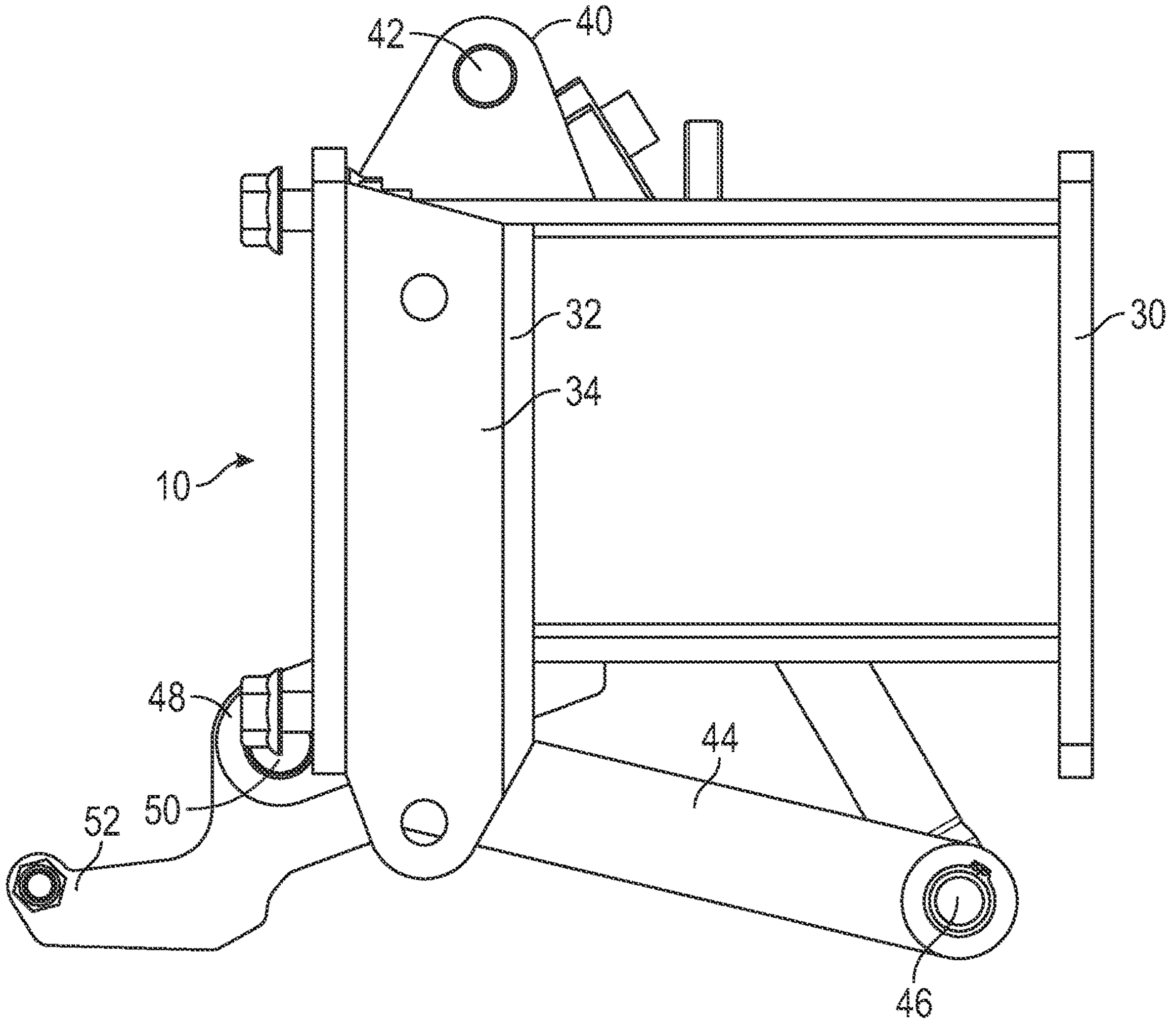
FIG. 13 is a right side elevation view of the lift assembly shown in FIG. 12, and the left side elevation view being a mirror image.
Figure 14:
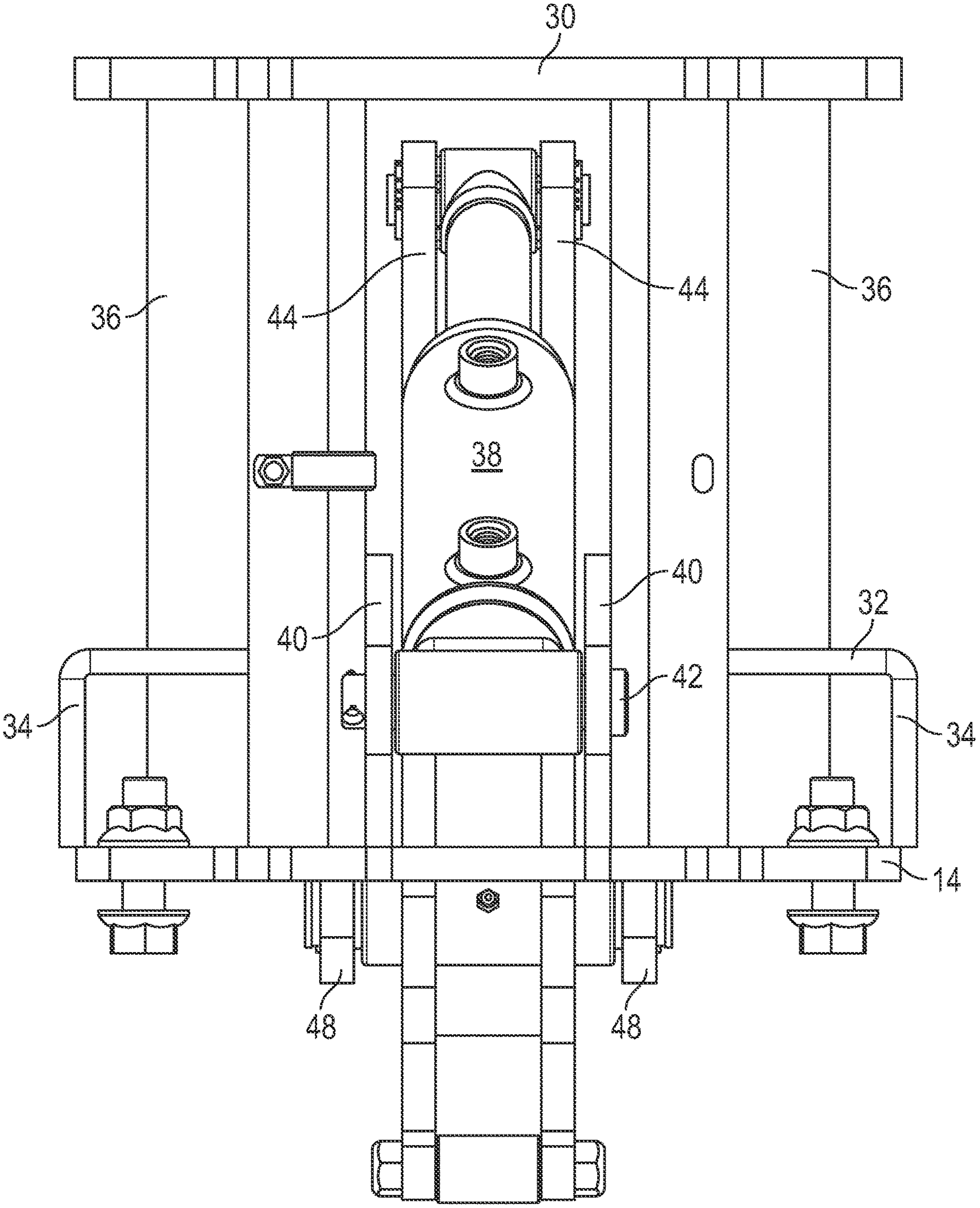
FIG. 14 is a top plan view of the lift assembly as shown in FIG. 14.
Figure 15:
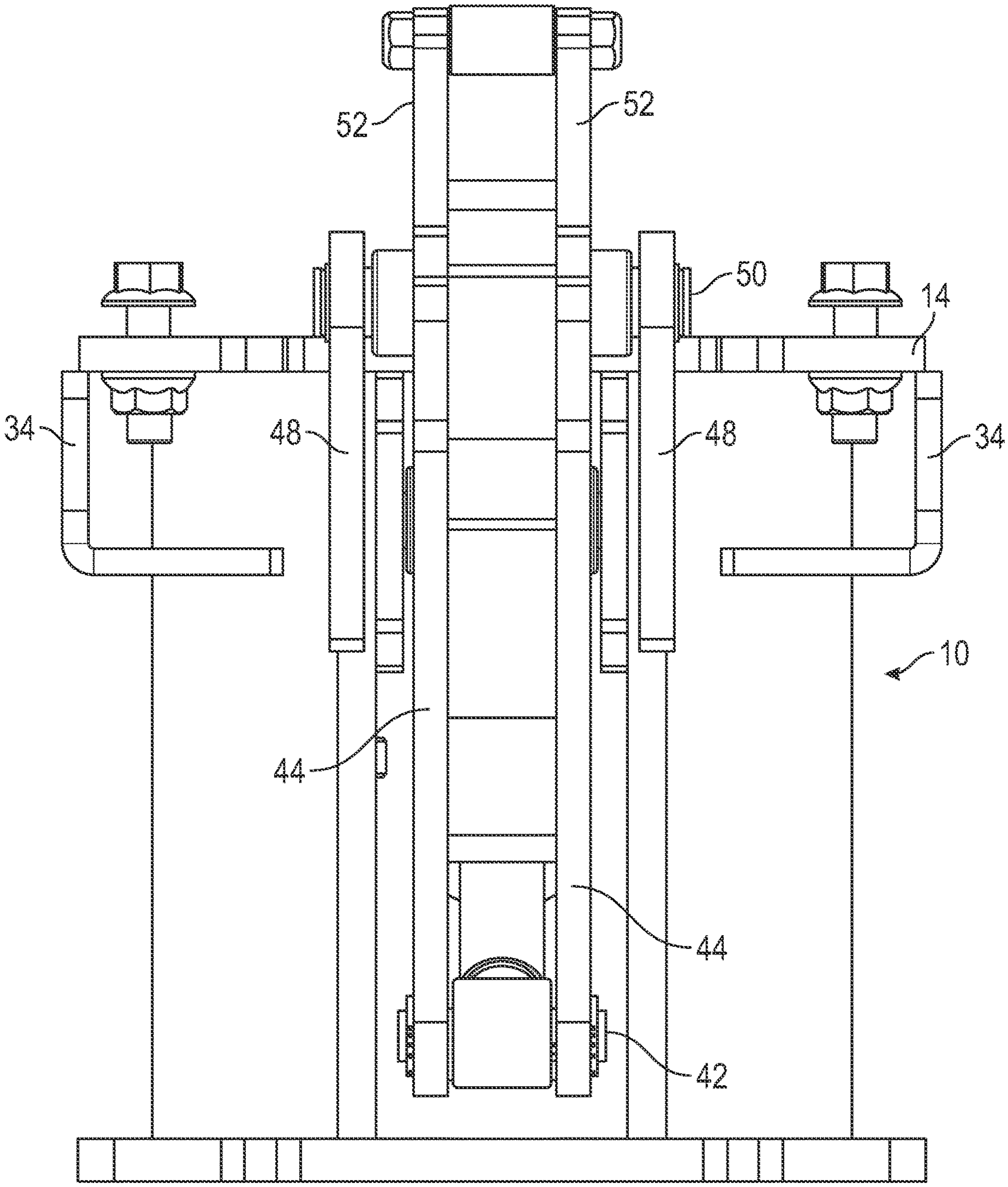
FIG. 15 is a bottom plane view of the lift assembly as shown in FIG. 14.
Figure 16:
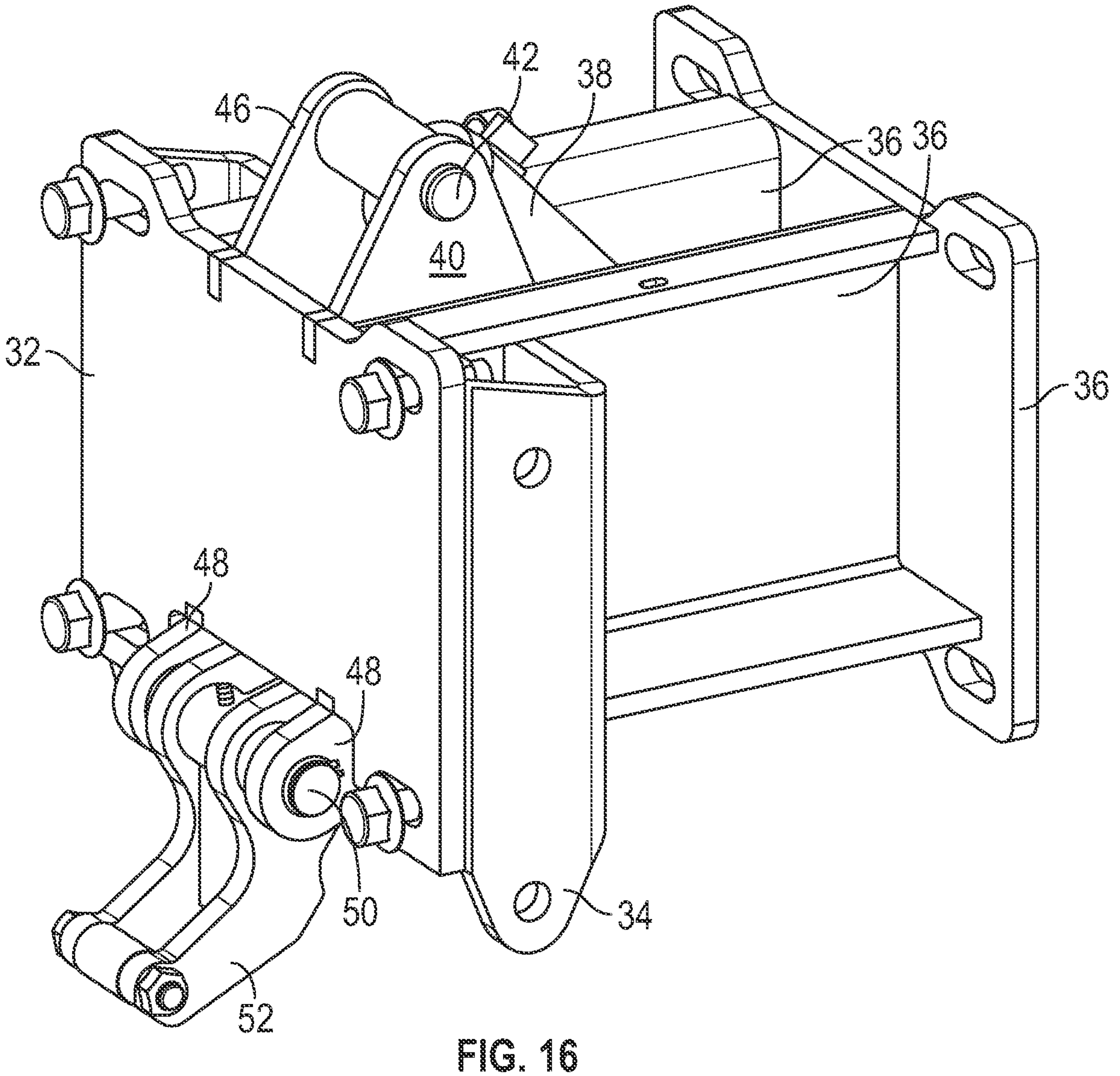
FIG. 16 is a perspective view of the lift assembly in a retracted position.
Figure 17:
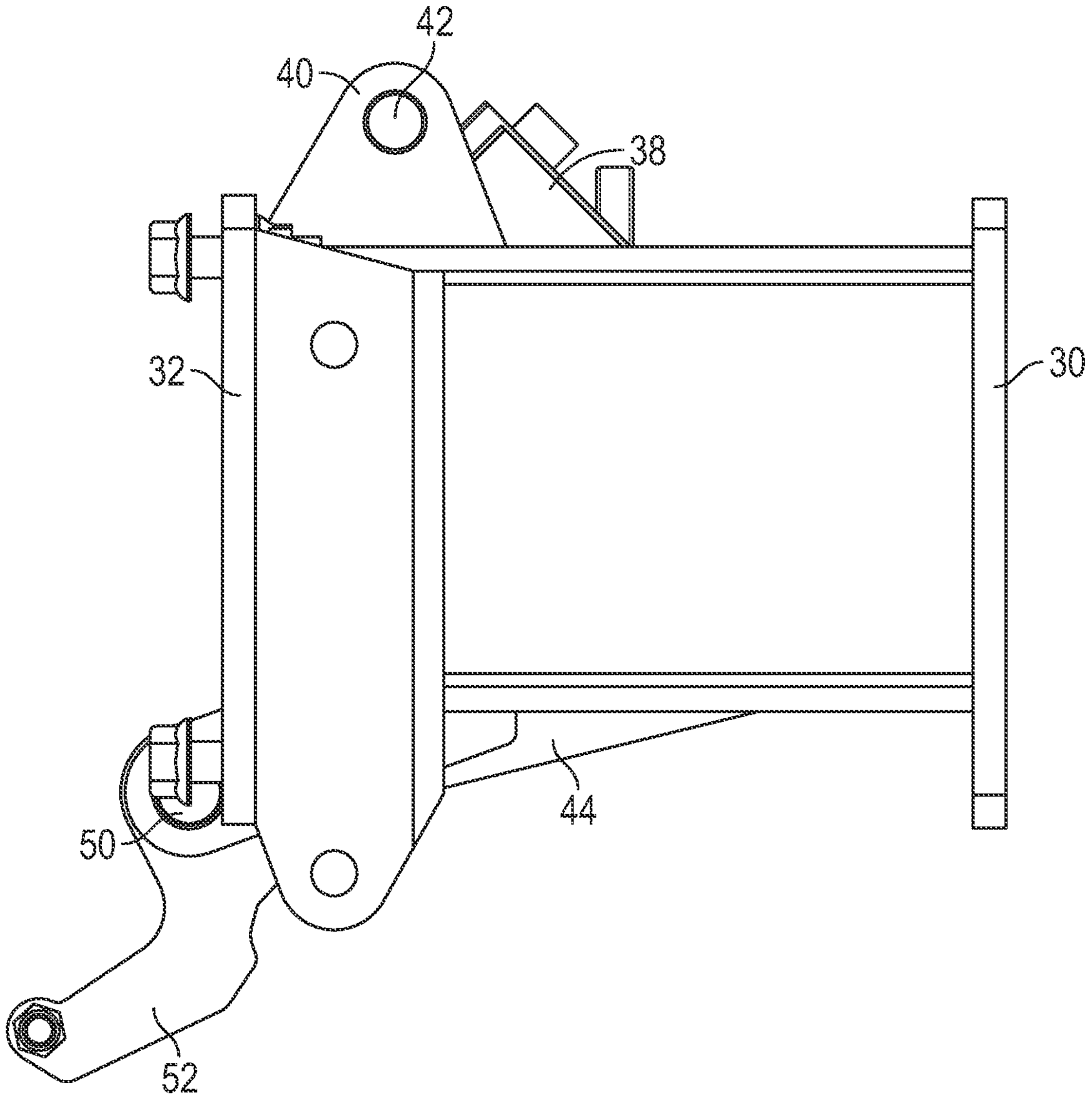
FIG. 17 is a right side elevation views of the lift assembly shown in FIG. 16, and the left side elevation view being a mirror image.
Figure 18:
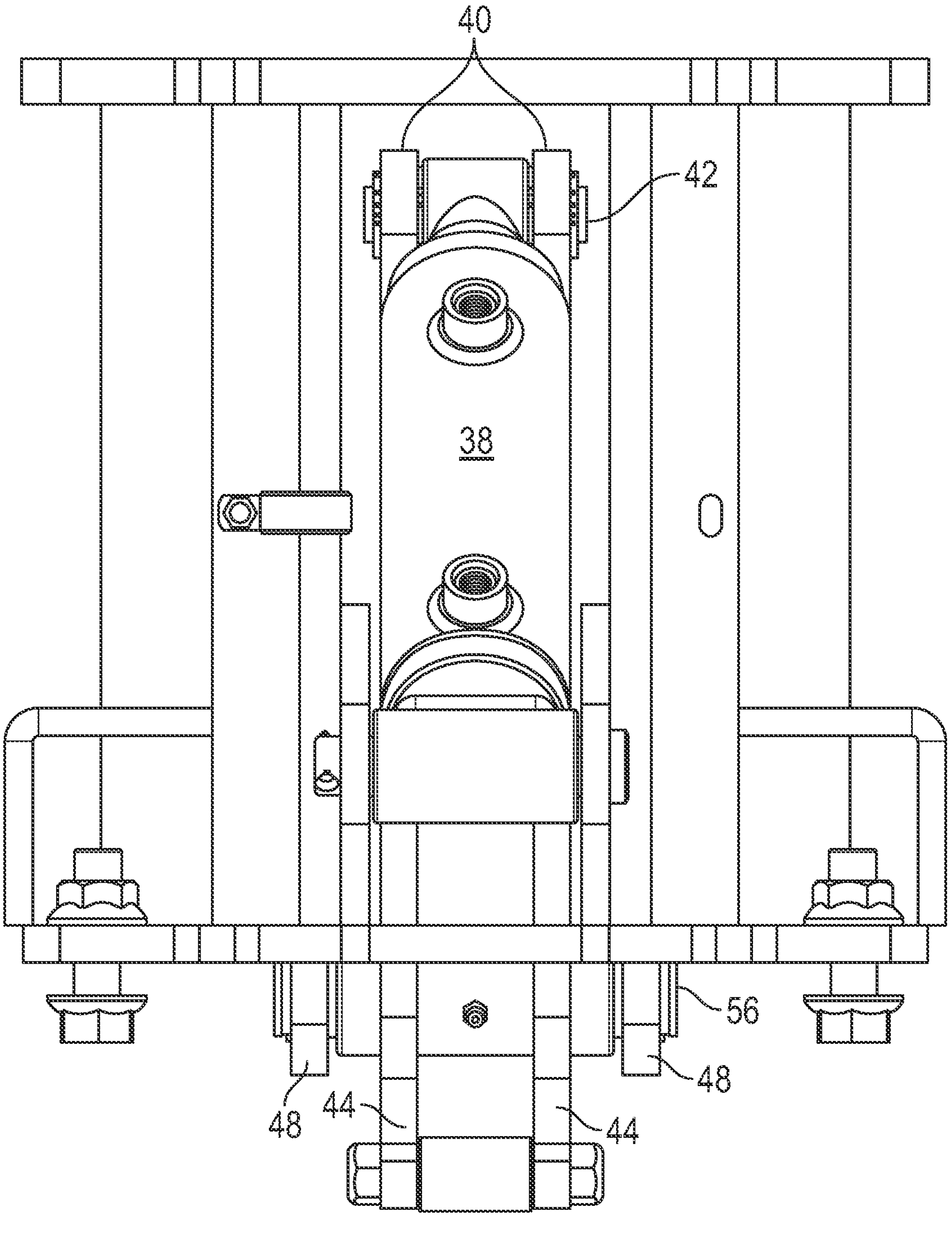
FIGS. 18 and 19 are top and bottom plan views, respectfully, of the lift assembly shown in FIG. 16.
Figure 19:
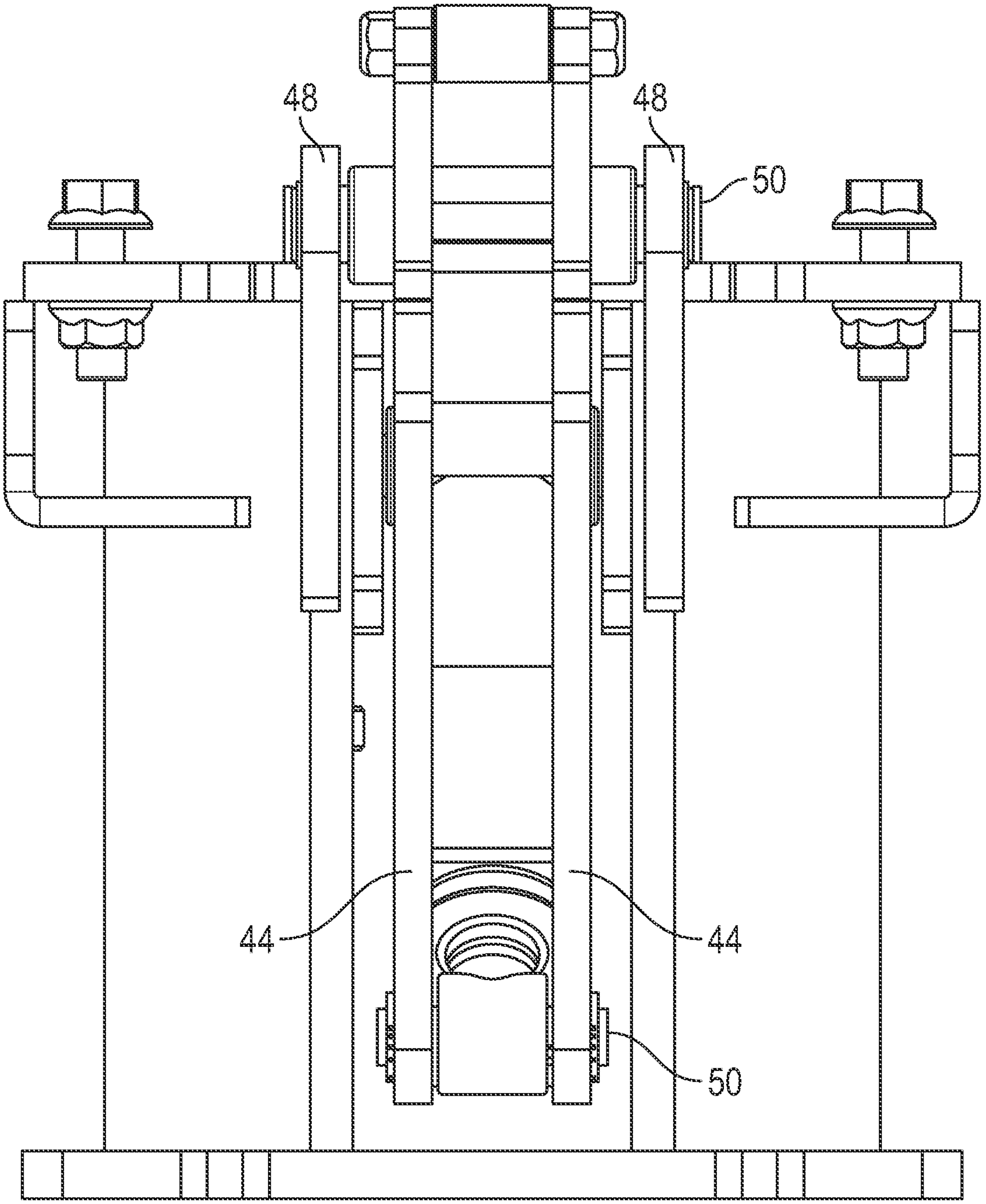

An actuator 38 resides between the plates 30, 32, and 36. The actuator 38 may be a hydraulic cylinder operably connected to the hydraulic system of the tractor. Alternatively, the actuator 38 may be an electric motor with a linear actuator, as shown in FIG. 11. The upper end of the actuator 38 is pivotally connected to support plates 40 via a pin 42. Another alternative actuator is an air bag, which can be inflated to raise the row unit and deflated to lower the row unit.

Figure 8:
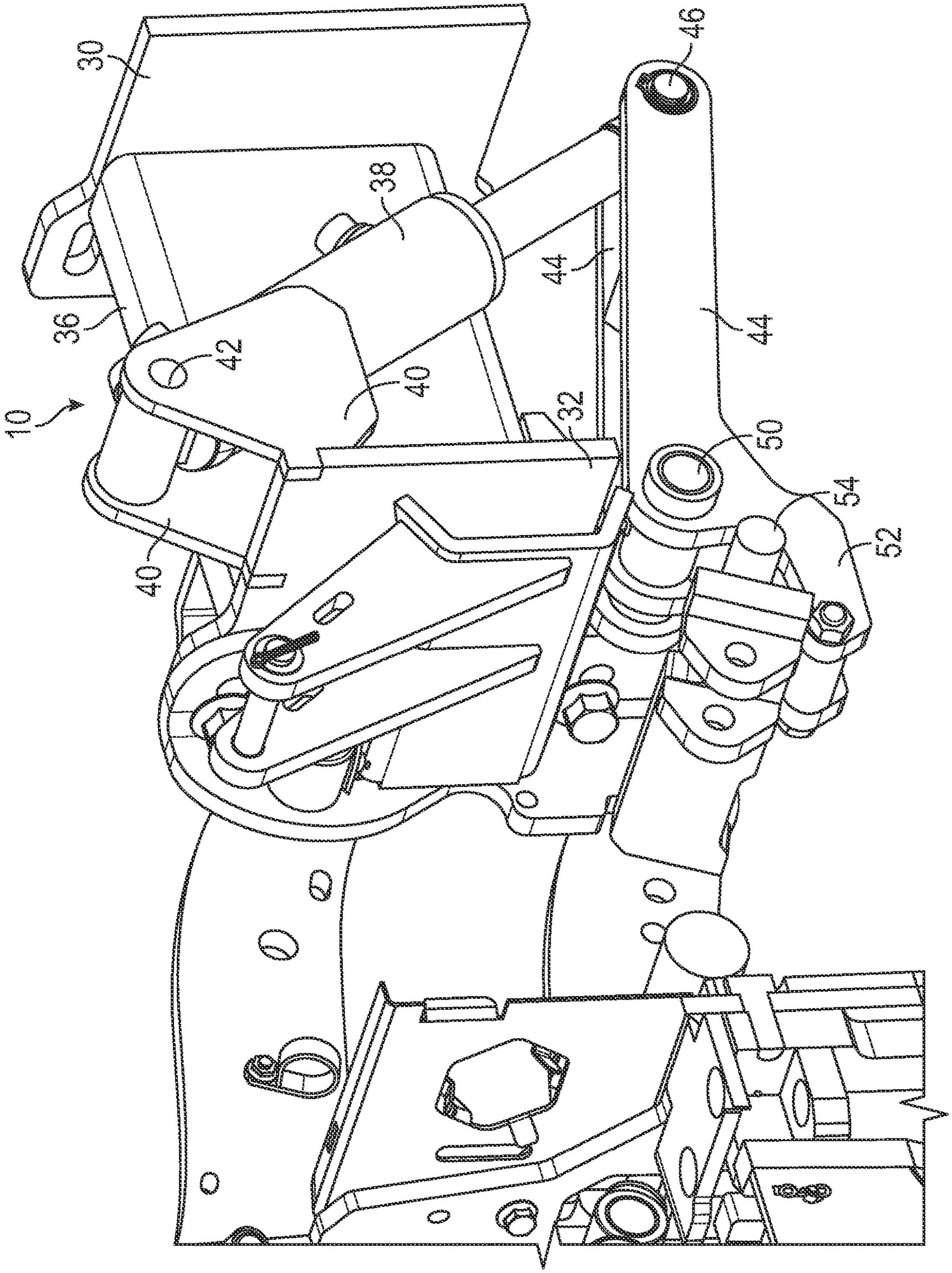
FIGS. 8 and 9 are enlarged upper and lower perspective views, respectfully, of the row unit and lift assembly shown in FIG. 5, with the right side plate removed for clarity, and with the downforce cylinder removed for clarity.
Figure 9:
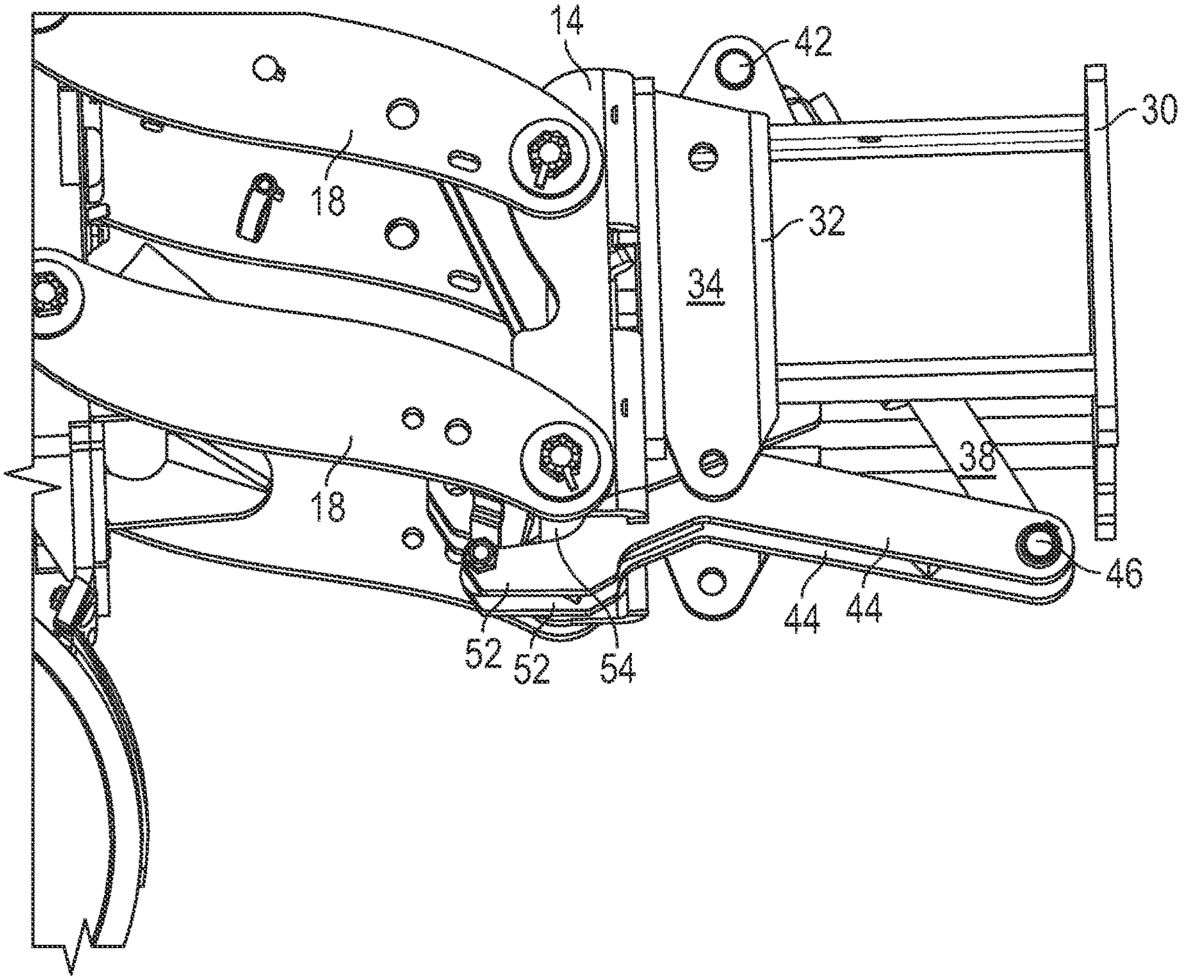
Figure 10:
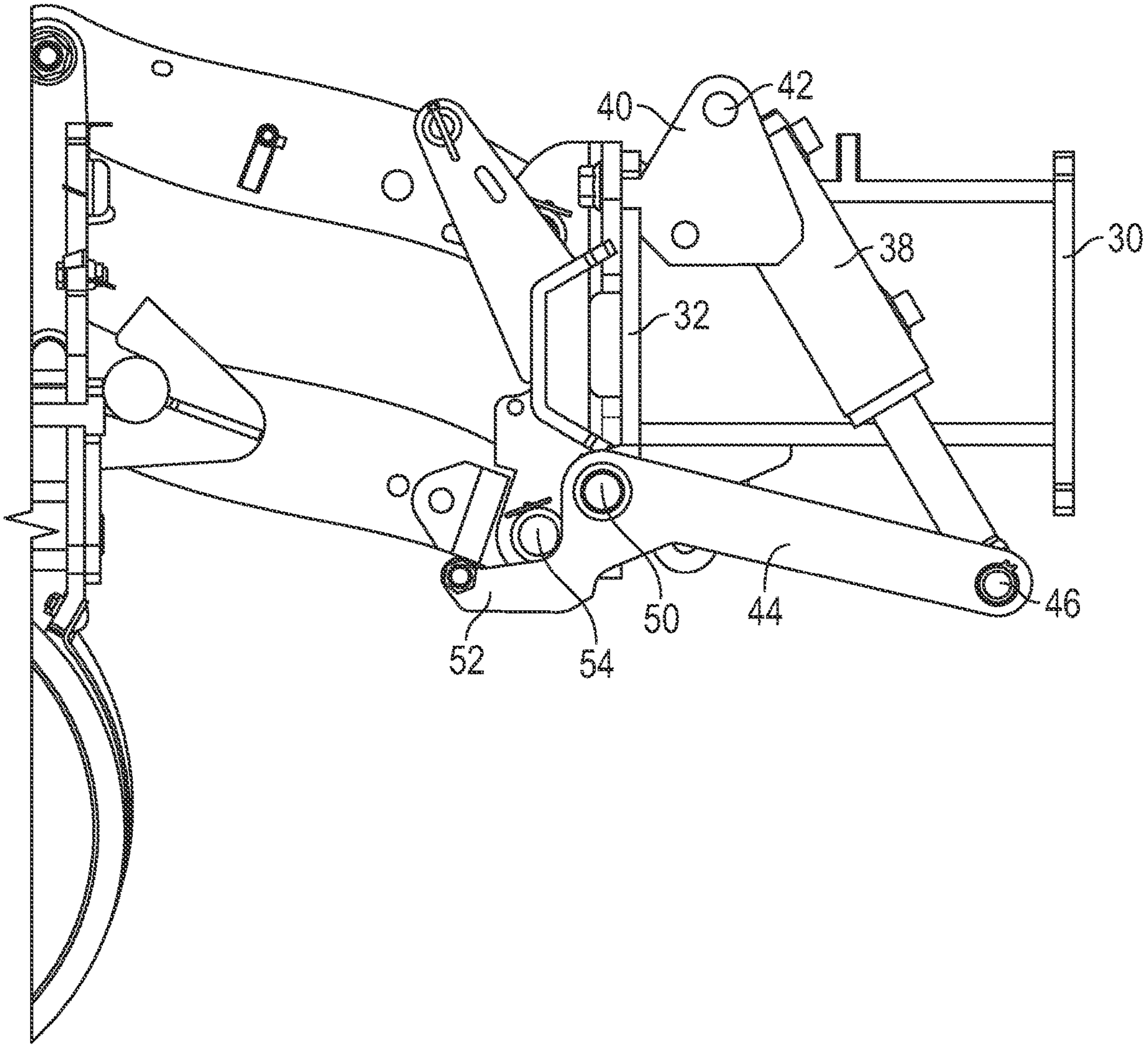
FIG. 10 is a side elevation view of the row unit and lift assembly shown in FIG. 8.

The lower end of the actuator 38 is pivotally connected to the forward end of a pair of arms 44 via a pin 46. The arms 44 extend rearwardly and are pivotally mounted to tabs 48 on the rear plate 32 by a pin 50. See FIG. 11. The rear ends 52 of the arms 44 extend rearwardly beyond the rear plate 32 and have a curvature or notch adapted to engage a cross shaft 54 extending between the lower link arms 18 as seen in FIGS. 8-10. It is understood that the arms 44 may take various configurations, other than that shown in the drawings. Also, the dual arms 44 may be replaced with a single arm that engages the shaft 54. As a further alternative, the arm or arms engage the upper or lower parallel link arms of the row unit, without using a cross shaft 54.

Figure 20:
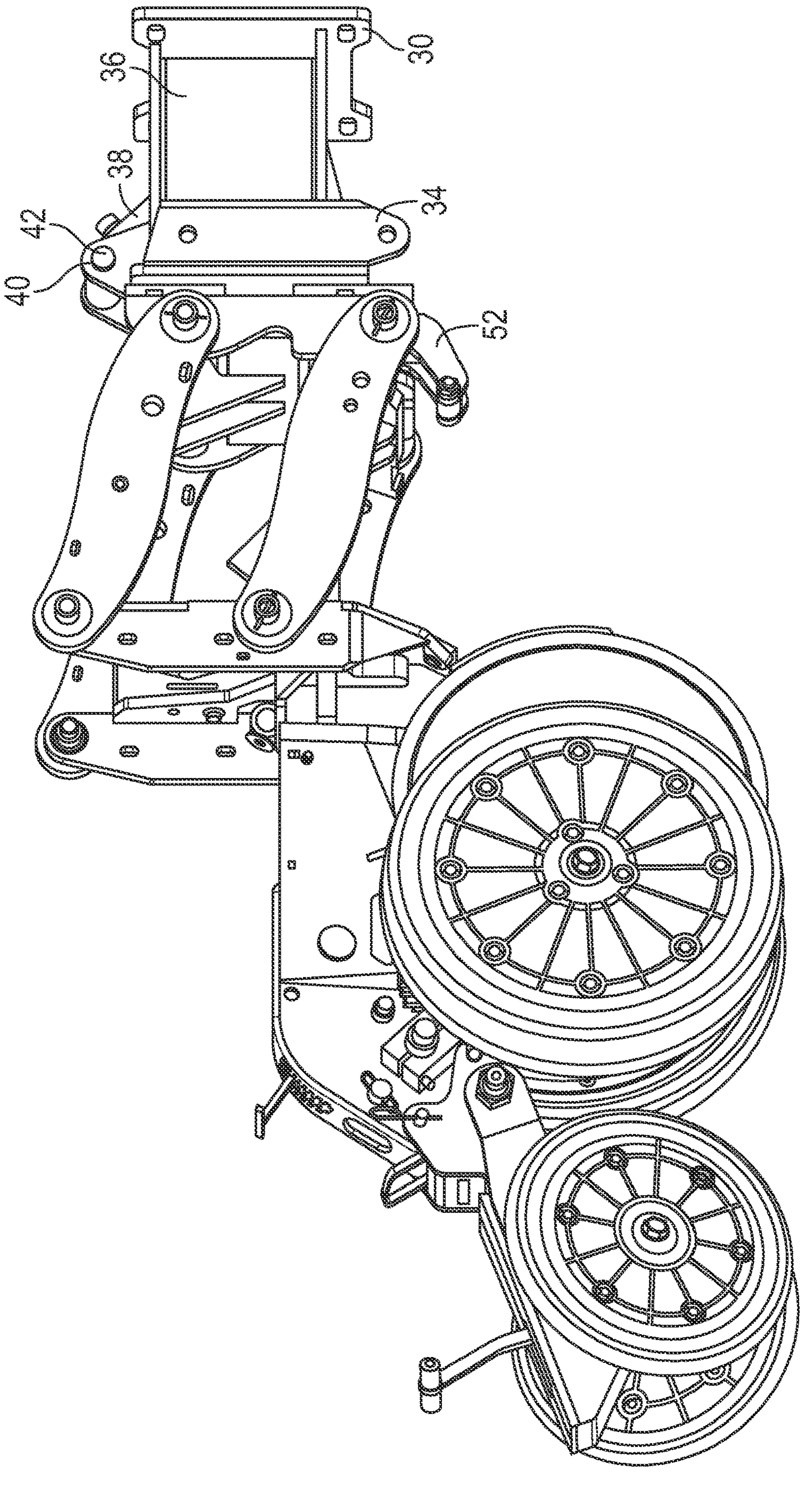
FIG. 20 is a perspective view of a row unit and the lift assembly with the row unit locked in a raised position and the lift assembly in a retracted position.
Figure 21:
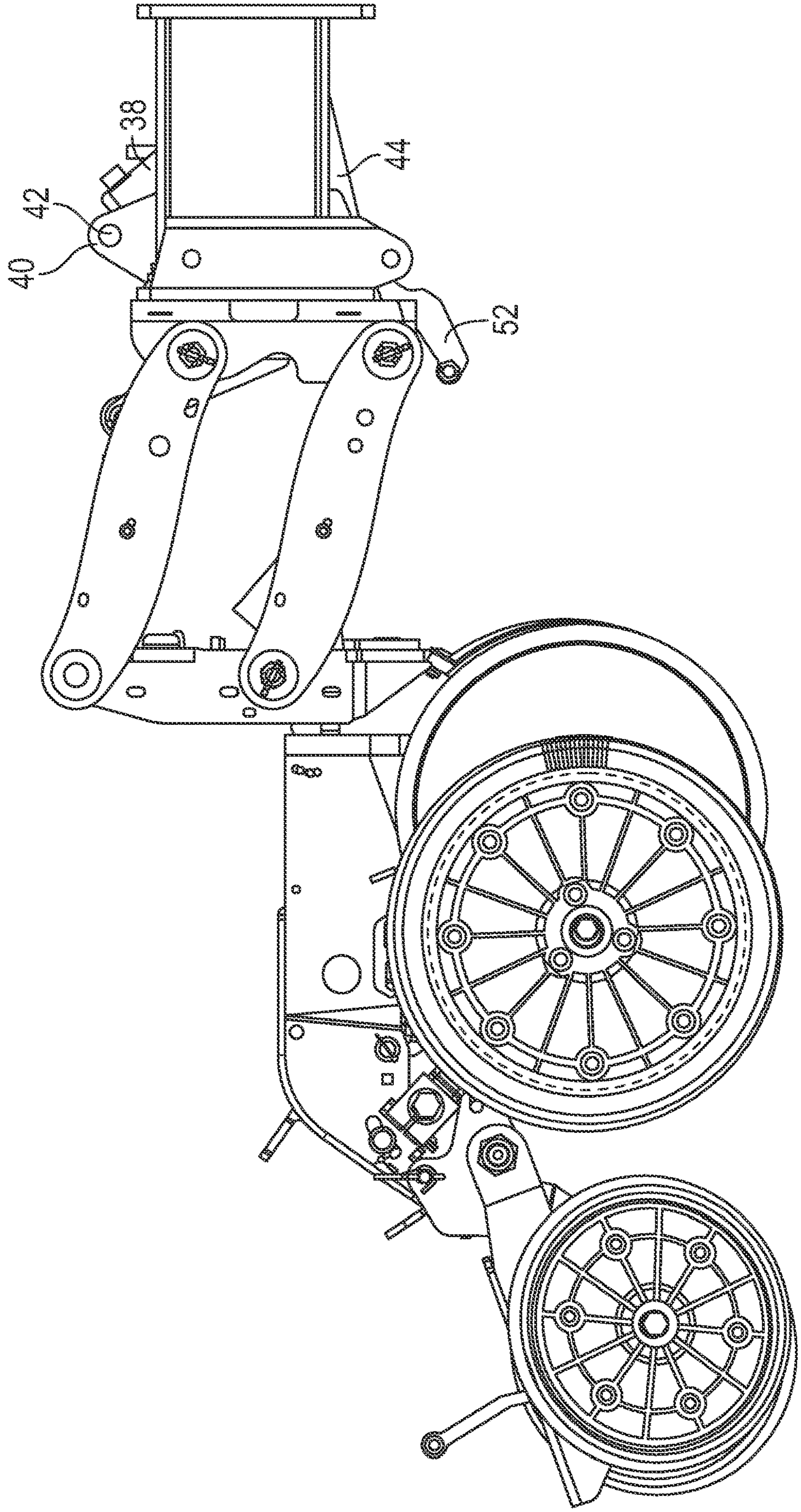
FIG. 21 is a right side elevation view of the row unit and lift assembly shown in FIG. 20, and the left side elevation view being a mirror image.
Figure 22:
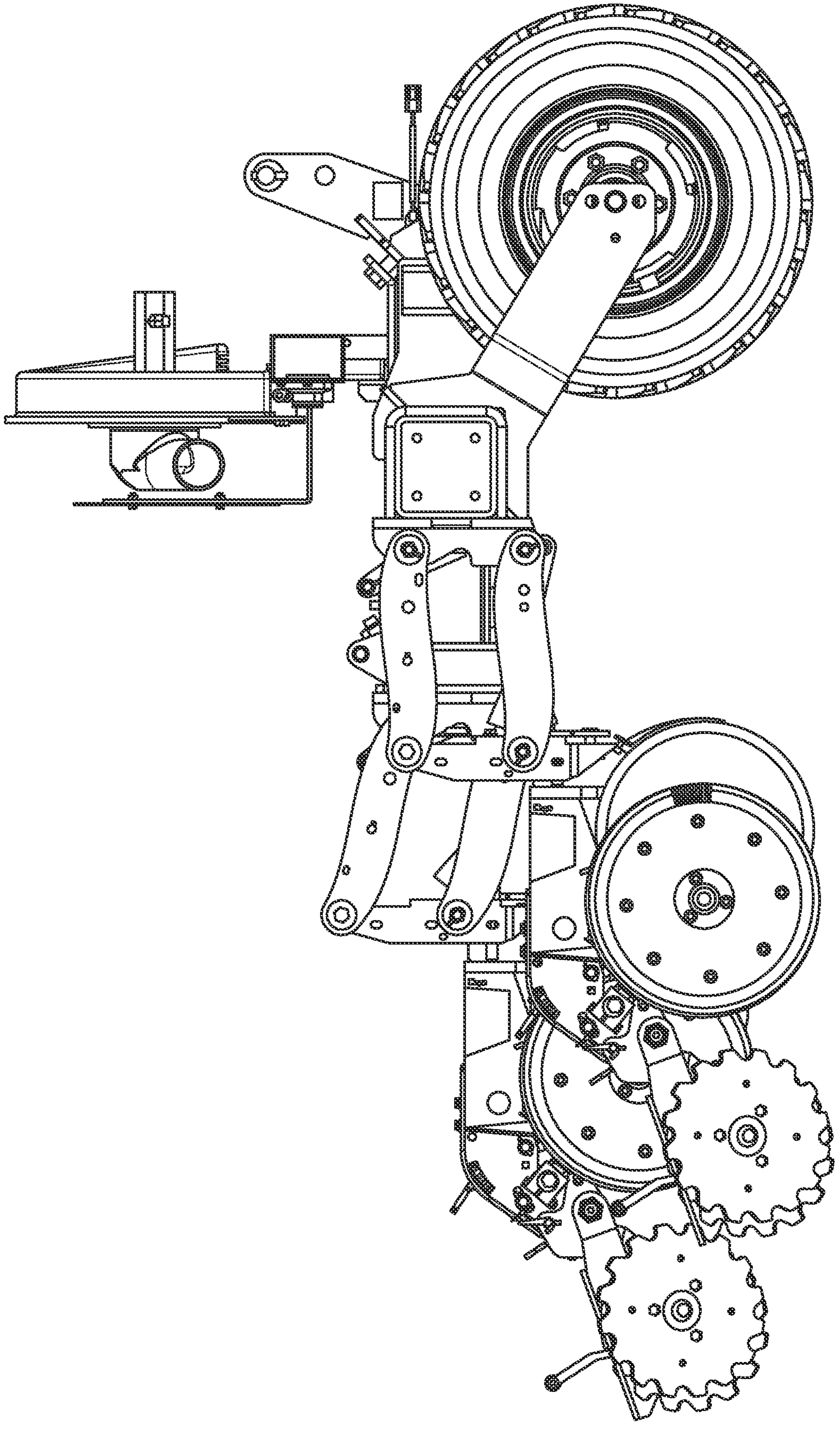
FIG. 22 is a right side elevation view with the row unit in a raised position.
Figure 23:
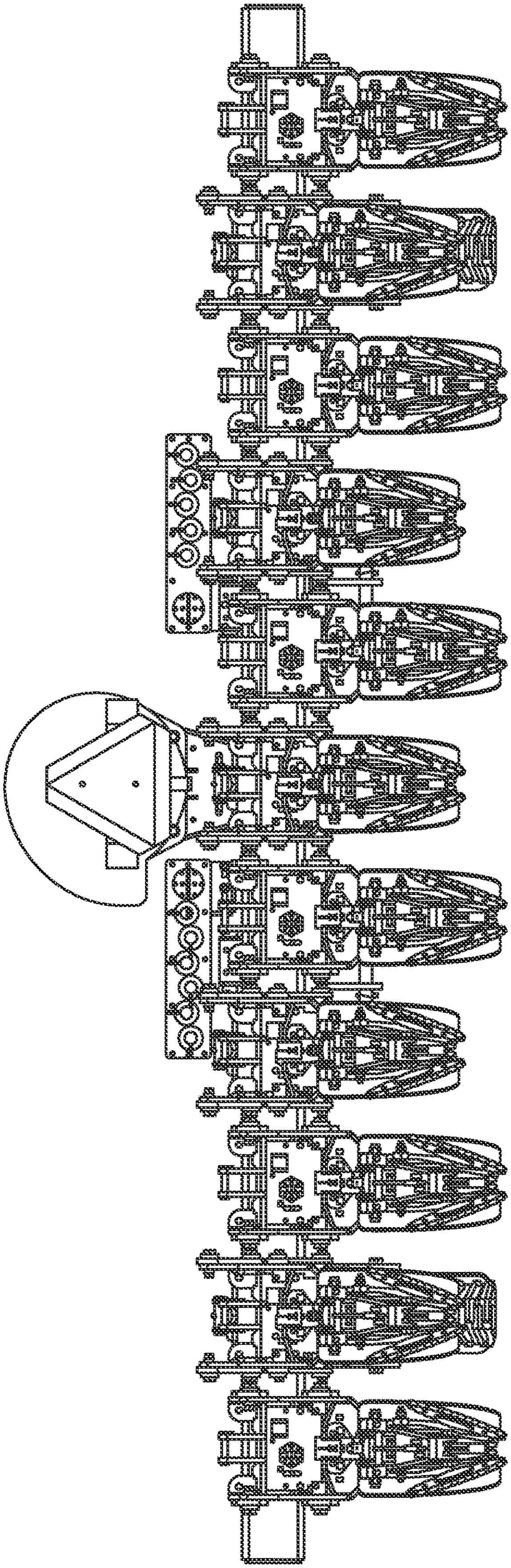
FIG. 23 is a rear elevation view, with the row unit in the raised position.
Figure 24:
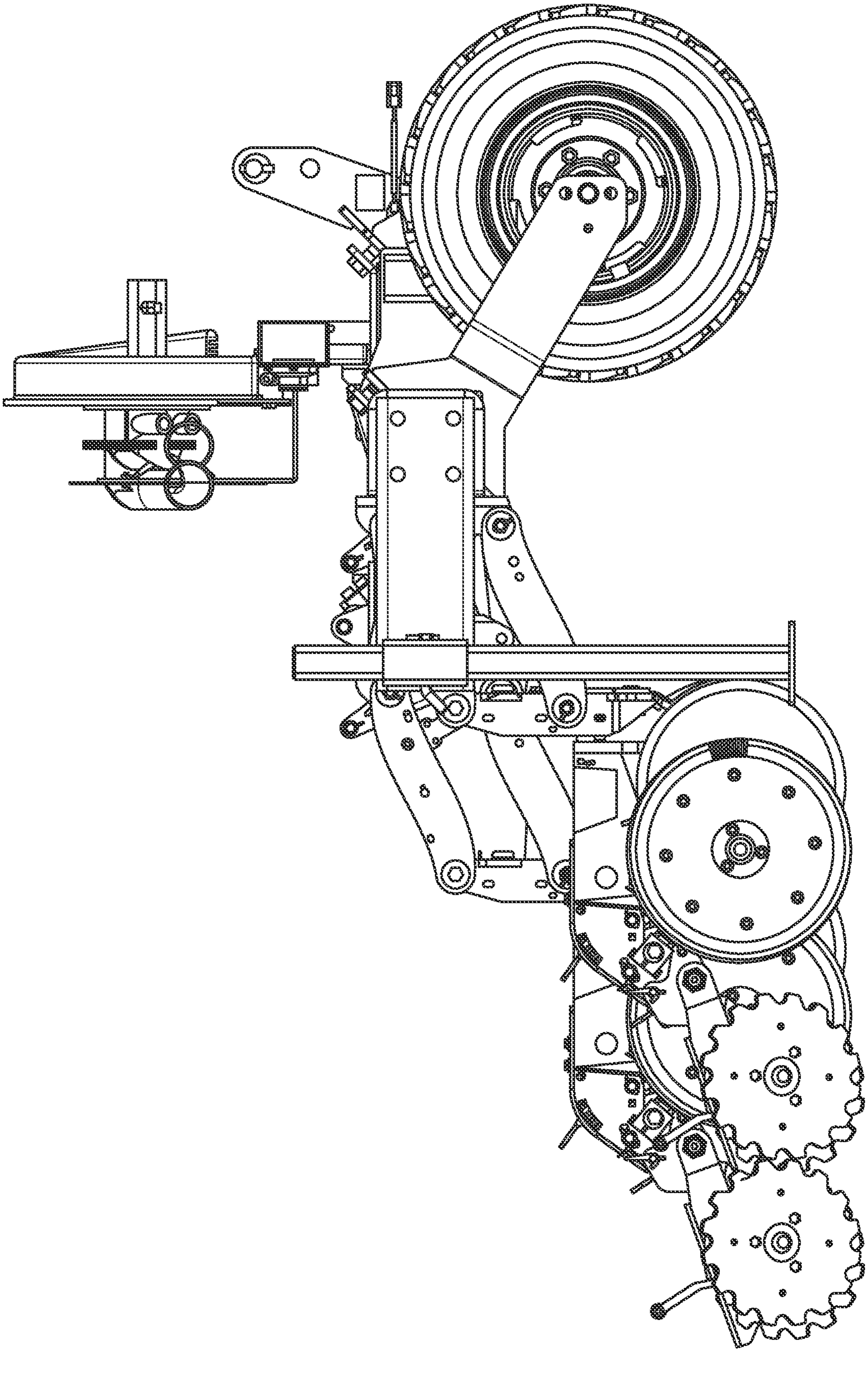
FIG. 24 is a right side elevation view with the row unit in a lowered position.
Figure 25:
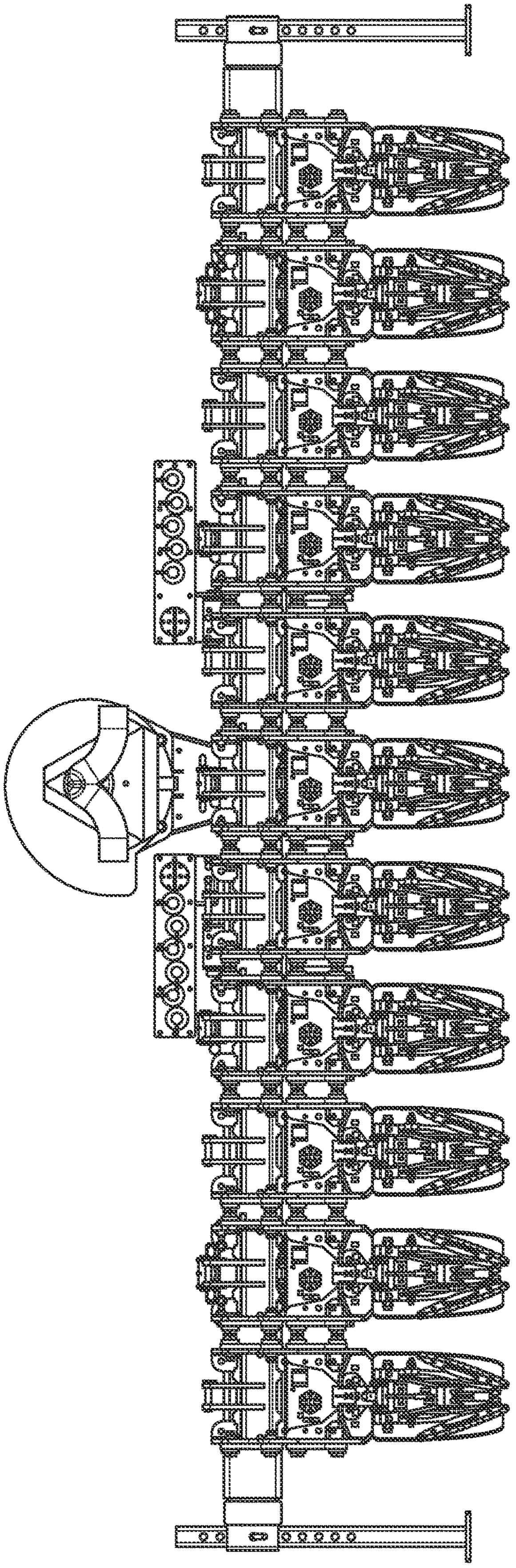
FIG. 25 is a rear elevation view, with the row unit in the lowered position.

In operation, the lift assembly 10 moves the row unit 12 between a lowered position (FIGS. 1-4) when the actuator 38 is retracted, and a raised position (FIGS. 5-7-9) when the actuator 38 is in an extended position. More particularly, when the actuator is retracted, the arms 44 move downwardly to allow the link arms 18 to pivot downwardly, thereby moving the row unit to a ground-engaging, planting position. When the actuator 38 is extended, the arms 44 push upwardly on the shaft 54 to pivot the link arms 18 upwardly to raise the row unit 12 off the ground to a non-planting position. When the row unit 12 is in the raised position, a mechanical lock can be engaged to maintain the row unit 12 in the raised position. An example of the mechanical lock is shown and in Applicant's U.S. Pat. No. 10,779,463, which is incorporated herein by reference. When the mechanical lock is engaged, the actuator can be retracted, such that the rear end 52 of arms 44 is disengaged from the cross shaft 54, as shown in FIGS. 20, 21, so as to minimize the pressure in the hydraulic system.

With the lift assembly frame inserts installed between each row unit and the tool bar, an operator can selectively raise and lower the row units independently of one another from the cab of the tractor, for desired planting operations. For example, seed corn production requires certain row units be raised out of the soil during the planting of male or female rows to allow for accurate timing of pollination between the male and female corn rows. Seeds for one of the sexes is planted first, then after plants from the first seeds begin to emerge, seeds for the opposite sex corn plants can be planted. This requires the planter row units to be raised in the rows corresponding to the first plantings so that the emerged plants are not destroyed by the wheels or discs of the row unit. With the lift systems or assemblies 10 of the present invention, the operator can quickly and easily select the row units which need to be raised before the alternate sex seeds are planted.

It is understood that a lift assembly 10 may be provided on all or some of the row units mounted on the tool bar. Preferably, the lift assemblies 10 are hydraulicly plumbed or electrically coupled as groups, so that the farmer or operator can select which row units to raise or lower as a group through manual control valves and/or on-off switches in the hydraulic/electrical systems. Then, all of the selected row units can be raised or lowered simultaneously, rather than individually. The lift assemblies 10 allow the selected row units to be raised from the tractor cab. The pivot arms 44 of each lift system push upwardly on the bottom of the cross shaft 54 when the actuator 38 is extended so as to raise the row unit. When the actuator 38 is retracted, the pivot arms 44 allow the row unit 12 to be lowered. When the actuators 38 are fully retracted, the pivot arms 44 allow the parallel link arms 18 of the row units 12 to freely pivot, without interference when the row unit moves upwardly and downwardly through the field following the soil terrain.

If desired, after the lift assemblies 10 raise the row units 12, the lock mechanisms can be deployed to physically hold the row units in the raised position. When the operator needs to release the locks, the lift system actuator 38 is extended slightly, which will release the spring-bias lock mechanisms, such that the row units 12 can be lowered by retracting the actuators 38.

The lift system allows the farmer to pre-plan a prescription for the agricultural field based on soil types, disease, insect control, male/female seed corn row configurations and other factors, so as to allow the lift system to automatically raise and lower the row units 12. This automatic system will produce less soil disturbance for reduced soil erosion, minimize fuel consumption, reduce soil moisture loss, and minimize wear on planter ground engaging components. The prescription information can be supplied to the lift system computer control console via GPS mapping systems.

The row units are often used to plant a variety of other crops, other than corn, which would require use of all the row units. The lift assemblies of the present invention allow different planting operations to be accomplished for various crops, while eliminating the need to manually raise and lower select row units. The lift assemblies 10 also allow all the row units to be quickly and easily raised for transport, or for turning at the end of a field, or at other desired times.

What is claimed is:

1. A lift assembly for an agricultural row unit having a front plate and parallel link arms, the lift assembly comprising:

an insert having a forward end adapted to be mounted to a tool bar and a rear end adapted to be connected to the front plate of the row unit;

an actuator arm pivotally mounted on the insert between first and second ends, and the second end operatively engaging the link arms;

an actuator on the insert operatively connected to the first end of the actuator arm;

whereby the actuator is extendable from a first position to pivot the actuator arm in a first direction and thereby pivot rear ends of the link arms upwardly about forward ends of the link arms so as to raise the row unit and retractable to a second position to pivot the actuator arm in an opposite second direction and thereby pivot the rear ends of the link arms downwardly about the forward ends of the link arms so as to lower the row unit.

2. The lift assembly of claim 1 wherein the actuator is a cylinder having an extensible and retractable rod to raise and lower the link arms.

3. The lift assembly of claim 1 wherein the actuator includes an electric motor and a screw.

4. The lift assembly of claim 1 wherein the actuator is independent from a down force cylinder of the row unit.

5. The lift assembly of claim 1 wherein the link arms are free to pivot when the actuator is retracted.

6. The lift assembly of claim 1 wherein the actuator is moved remotely.

7. A method of coordinating raising and lowering of a plurality of row units for planting rows of male and female sexes of corn, comprising;

raising row units corresponding to one of the corn sexes and lowering row units corresponding to the other of the corn sexes;

the raising and lowering of the row units being accomplished by automated actuators connected to the row units, and the row units each include parallel link arms and the actuators each include a pivotal actuator arm operatively engaging the link arms; and the actuators engaging pivotal link arms supporting the row units, and pivoting the link arms upwardly and downwardly to raise and lower the row units without linear movement of the link arms, and wherein extension of the actuator pivots the actuator pivots the actuator arm in a first direction to raise the link arms and pivots the actuator arm in an opposite second direction to lower the link arms.

8. The method of claim 7 wherein the row units are raised by extending the actuators and the row units are lowered by retracting the actuators.

9. The method of claim 7 wherein the automated actuator is selected from a group comprising a hydraulic cylinder, an electric motor, and an air bag.

10. The method of claim 7 wherein the actuators are controlled from a cab of a tractor pulling the row units.

11. The method of claim 7 wherein the actuators are hydraulically or electrically moved between extended and retracted positions.

* * * * *